United States Patent [19]
Margulies et al.

[11] 3,926,524
[45] Dec. 16, 1975

[54] METHOD OF AND MEANS FOR OBTAINING A PAIR OF ORTHOGONAL LINEAR DICHROIC PARAMETERS

[75] Inventors: Leon Margulies, Rehovot; Yehuda Mazur, Tel Aviv; Jacob Sagiv; Amnon Yogev, both of Rehovot, all of Israel

[73] Assignee: Yeda Research and Development Co., Ltd., Rehovot, Israel

[22] Filed: Apr. 8, 1974

[21] Appl. No.: 459,167

[30] Foreign Application Priority Data
May 3, 1973 Israel.................................. 42186

[52] U.S. Cl................................ 356/114; 356/201
[51] Int. Cl.²......................................... G01N 21/40
[58] Field of Search ........... 356/114, 201, 204, 205, 356/244, 115; 250/225

[56] References Cited
UNITED STATES PATENTS
3,741,660   6/1973   Abu-Shumays et al......... 356/116 X OTHER PUBLICATIONS
Mandel et al., "High Sensitivity Linear Dichroism ..." Rev. Sci. Instru., Vol. 41, No. 5, pp. 755–758, May 1970.

Primary Examiner—Edward S. Bauer
Assistant Examiner—Matthew W. Koren
Attorney, Agent, or Firm—Donald M. Sandler

[57] ABSTRACT

A pair of orthogonal linear dichroic parameters of an oriented sample (e.g., its optical density to light of a given wavelength having one state of linear polarization with respect to the direction of orientation and its optical density to light of the same wavelength having an orthogonal state of linear polarization) is obtained by sequentially projecting through the sample two beams of light of the same wavelength. One of the beams is linearly polarized in a direction either parallel or perpendicular to the direction of orientation of the sample, and the other of the beams is non-polarized. The two resultant optical densities, for example, can be used to compute the dichroic ratio at the wavelength in question.

13 Claims, 4 Drawing Figures

METHOD OF AND MEANS FOR OBTAINING A PAIR OF ORTHOGONAL LINEAR DICHROIC PARAMETERS

This invention relates to a method of and means for obtaining a pair of orthogonal linear dichroic parameters (as defined herein) associated with a linearly dichroic anisotropic material.

A dichroic anisotropic material is one having an absorption coefficient that depends on the direction of propagation of light therethrough and the state of polarization of the light travelling in a particular direction. If the absorption in a dichroic material is different for different linear states of polarization, the material is termed "linearly dichroic." The ratio of the coefficients of absorption associated with the two orthogonal states of polarization in a particular direction of propagation yielding maximum and minimum absorption is termed the "dichroic ratio" which is dependent only on the material and is independent of the concentration of the material and the path length of light therethrough. Knowledge of the dichroic ratio of a linearly dichroic anisotropic material is of great importance because it provides information on the structure of constituent molecules and on the absorption bands associated with such molecules arising from spectroscopic analysis.

The dichroic ratio of an oriented sample may be obtained with the aid of a spectrophotometer calibrated to measure optical density or transmittance. By measuring the optical density of an oriented sample using light of a given wavelength $\lambda_o$ and linearly polarized in a direction parallel to the direction of orientation to obtain the parameter $(OD_\parallel)\lambda_o$, and then measuring the optical density using light of the same wavelength but linearly polarized in a direction perpendicular to the direction of orientation to obtain the parameter $(OD_\perp)\lambda_o$, the dichroic ratio $d\lambda_o$ at the given wavelength can be obtained by taking the ratio of the two measured parameters. Such ratio yields the dichroic ratio because the optical density at a given wavelength is defined as the product of the absorption coefficient by the optical path length through the sample and the sample concentration.

Alternatively, the transmittance can be measured to obtain the pair of parameters $(T_\parallel)\lambda_o$ and $(T_\perp)\lambda_o$, and the dichroic ratio calculated on the basis that the optical density is minus the logarithm (base 10) of the transmittance. It is thus immaterial which of the two pairs of parameters is measured, and for this reason, reference hereinafter to "a pair of orthogonal linear dichroic parameters" refers to either $(OD_\parallel)\lambda_o$ and $(OD_\perp)\lambda_o$ on the one hand, or $(T_\parallel)\lambda_o$ and $(T_\perp)\lambda_o$ on the other hand depending upon the context in which the term is used. Implicit in this term, however, is the understanding that each parameter of a pair of orthogonal linear dichroic parameters is associated with the same wavelength, and for this reason, the subscript $\lambda_o$ is omitted hereinafter. Furthermore, obtaining a pair of orthogonal linear dichroic parameters permits dimensionless ratios other than the dichroic ratio to be calculated. For example, the ratio of the sum to difference of a pair may prove useful in the study of molecular structures. Therefore, while reference is made hereinafter to calculating the dichroic ratio, it should be understood that this dimensionless ratio is but one example of many calculations that can be carried out once a pair of orthogonal linear dichroic parameters is known.

The first step in obtaining a pair of orthogonal linear dichroic parameters is to orient the molecules to provide what is termed an oriented sample; and this can be done by incorporating the molecules into a crystal, for example, or by incorporating them into a stretchable film. Other approaches for orienting the molecules include incorporating them in a flowing fluid, or in a fluid subjected to an electric or magnetic field. Having created an oriented sample, a pair of orthogonal linear dichroic parameters can be obtained using a conventional spectrophotometer, in principle, by passing through the sample a beam of light of a given wavelength linearly polarized in a direction parallel to the direction of orientation to obtain one of the pair of parameters, and then rotating either the plane of polarization, or the sample itself through 90° to obtain the other of the pair of parameters at the same wavelength.

The principle problem with this approach arises because of the non-homogeneous nature of the sample which causes its light absorbing properties to depend on its attitude independently of its different coefficients of absorption. Thus, rotation of the sample introduces an unknown quantity into either optical density or transmittance measurements. Instead of rotating the sample, the plane of polarization can be rotated, but this is an expedient that cannot be achieved easily in a conventional spectrophotometer.

An accessory for spectrophotometers is known which makes it possible to determine an approximation of the value of a pair of orthogonal linear dichroic parameters in a single spectral run using the identical portion of a sample for the two orthogonal modes of polarization. Neither the polarizer nor the sample need be moved in carrying out the process using this accessory which fits into the cell holder of one channel of a spectrophotometer located between the variable monochromator of the spectrophotometer and the detector. The accessory comprises a polarizer in the form of a Rochon prism, a waveplate and a depolarizer with provision being made for insertion of a sample between the waveplate and the depolarizer. In operation, the undeviated beam emerging from the polarizer is linearly polarized in a given direction and passes through the waveplate. By reason of the operation of the variable monochromator, the wavelength of the light passing through the polarizer can be varied over a band of wavelengths. The effect of the waveplate on the light passed by the polarizer is to produce light that is linearly polarized in alternate orthogonal directions at successive values of wavelength in the band, and elliptically polarized at all other values of wavelength. A waveplate achieves this result because the state of polarization of light transmitted by the waveplate depends on the relative retardation introduced thereby. Such relative retardation is directly dependent on the birefringence of the material of the waveplate and its thickness, and indirectly on the wavelength of the light. Since the birefringence is, itself, a function of wavelength, the period of alternation of the linearly polarized light is not uniform, and in general, the period increases with increases in wavelength.

The output of a spectrophotometer provided with an accessory of the type described above will be an oscillatory function of wavelength. Adjacent crests and troughs of the oscillations occur when the polarization of the incident beam differs by 90°. When calibrated to provide optical density, the envelope of the oscillations provides two absorption curves, one of which provides $OD_{\parallel}$ as a function of wavelength, and the other of which provides $OD_{\perp}$. The dichroic ratio at a given wavelength is computed by taking the ratio of the ordinates of the two absorption curves at such wavelength.

While this approach eliminates the problems associated with rotating the polarizer or rotating the sample, it creates other problems which become more important as attempts are made to more accurately determine the dichroic ratio. First of all, the accessory described above provides only discrete points on the absorption curves, and not the curves themselves as continuous functions of wavelength. Thus, it is necessary to fit a curve, either analytically or visually, to the discrete points before it is possible to obtain $OD_{\parallel}$ and $OD_{\perp}$ at the same wavelength, since the discrete points establishing one absorption curve are laterally displaced from the discrete points establishing the other absorption curve. In other words, if one desires the values of $OD_{\parallel}$ and $OD_{\perp}$ at a wavelength located between a wavelength forming a peak or a valley, both values of optical density at the selected wavelength on the two absorption curves can only be approximated.

If an attempt is made to reduce the separation between consecutive crests and troughs, i.e., to decrease the period of alternations in the direction of linearly polarized light, a limit is reached due to the finite resolving power of the spectrophotometer. As a result, sharp peaks (obtained when an attempt is made to reduce the separation), are lowered, while sharp valleys are raised thus concealing the true optical densities at the crests and troughs of the oscillations. When the sample under investigation is highly dichroic, which means that the absorption curves have sharp peaks or valleys, the limited resolving power of the spectrophotometer will prevent the output from responding with fidelity thus introducing distortion into the absorption curves. A further problem arises in regions of the absorption curves where the slope increases rapidly with small changes in wavelength. Obtaining a true representation of the optical density using the envelope of oscillations is obviously a poor approach to defining a region of high slope.

In summary, the known approach provides the absorption (or transmittance) curves for light polarized in directions parallel and perpendicular to the direction of orientation, in terms of the envelope of an oscillatory output of a spectrophotometer and thus yields a pair of orthogonal linear dichroic parameters only indirectly and with consequent limited accuracy. It is therefore an object of the present invention to provide a new and improved method of and apparatus for directly obtaining a pair of orthogonal linear dichroic parameters at any desired wavelength, or as continuous functions of wavelength.

According to the present invention, there is provided a method for obtaining a pair of orthogonal linear dichroic parameters of an oriented sample comprising the steps of sequentially projecting through the sample two beams of light at the same wavelength, one of which is linearly polarized in a direction either parallel or perpendicular to the direction of orientation of the sample, and the other of which is non-polarized, and obtaining either the optical density or transmittance of the sample in each beam.

It can be shown from the Beer-Lambert Law that a predetermined relationship exists between the optical densities at a given wavelength due to light polarized in directions perpendicular and parallel to the direction of orientation, and also due to non-polarized light. Such relationship, in its simplest form, is as follows:

$$10^{-OD_n} = \tfrac{1}{2}[10^{-OD_{\perp}} + 10^{-OD_{\parallel}}] \tag{1}$$

where the term OD stands for optical density, and the subscripts $n$, $\perp$ and $\parallel$ respectively stand for non-polarized, polarized perpendicular and polarized parallel to the direction of orientation.

From equation (1), it can be seen that given the quantities obtained by following the above method, namely, $OD_n$, for example, and one of either $OD_{\parallel}$ or $OD_{\perp}$, the other of the latter quantities can be computed. Thus, a pair of orthogonal linear dichroic parameters is derived from the data, and it is immaterial whether optical density or transmittance is measured.

The invention may be extended by varying the wavelength of both the polarized and non-polarized beam continuously over a predetermined band and obtaining either the optical density or transmittance of the sample as a continuous function of wavelength in the band. Using equation (1), a pair of orthogonal linear dichroic parameters can be derived as continuous functions of wavelength in the band covered by the measurements.

The invention also consists in an optical system for use in obtaining a pair of orthogonal linear dichroic parameters using the method described above. Such optical system comprises a sample holder adapted to hold an oriented sample or a reference specimen in the optical axis of the system, a depolarizer and a polarizer serially arranged on the optical axis for directing light through the sample holder, a depolarizer following the sample holder, and means for selectively removing the polarizer from the optical axis when the polarizer is between the depolarizer and the sample holder, or for moving the depolarizer from the optical axis when the depolarizer is between the polarizer and the sample holder. In the preferred arrangement, the depolarizer is located between the polarizer and the sample holder.

The invention also consists in a spectrophotometer rigged for dichroic studies using the method described above and comprising a light source, a varible wavelength monochromator for converting light from the source to a variable wavelength beam directed along the optical axis of the spectrophotometer, a sample holder positioned on the optical axis, a depolarizer and a polarizer serially arranged on the optical axis for directing light through the sample holder, means for selectively removing the polarizer from the optical axis when the polarizer is between the depolarizer and the sample holder, or for moving the depolarizer from the optical axis when the depolarizer is between the polarizer and the sample holder, a further depolarizer for depolarizing light emitted from the sample holder, and a detector for detecting the intensity of light passed by the polarizer.

Embodiments of the invention are illustrated by way of example in the accompanying drawings wherein.

Figure 1:
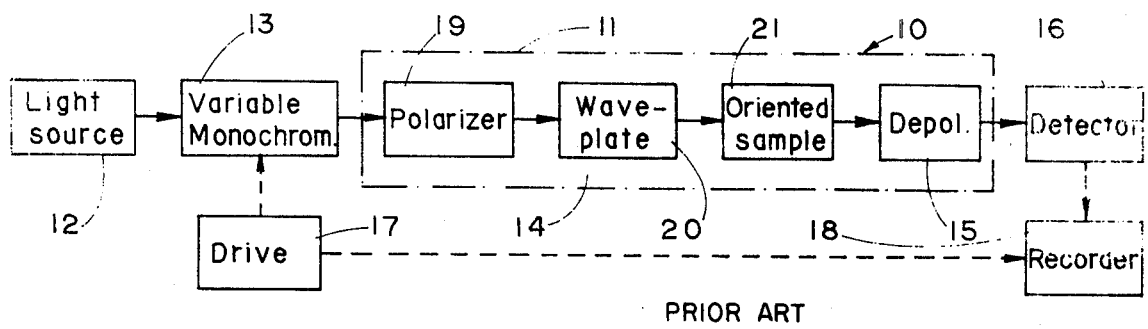
FIG. 1 is a block diagram of a conventional spectrophotometer provided with a conventional accessory by which the dichroic ratio of an oriented sample can be obtained in a single spectral run.

Referring now to FIG. 1, reference numeral 10 designates a conventional spectrophotometer rigged for obtaining an approximation of a pair of orthogonal linear dichroic parameters as a function of wavelength using conventional accessory 11. Actually, a conventional spectrophotometer has two channels, one for the specimen under investigation and the other for a reference, but only one channel is shown for simplicity. Spectrophotometer 10 comprises light source 12, variable monochromator 13, cell compartment 14 for holding accessory 11 and detector 16. Drive 17 associated with the spectrophotometer is mechanically coupled to the monochromator 13 and to strip chart recorder 18 which receives the output of the detector 16. Contained in cell compartment 14 is accessory 11 which comprises a polarizer 19, waveplate 20, oriented sample holder 21 and depolarizer 15 all mounted together as a unit.

In operation, monochromator 13 accepts light from source 12 providing to the polarizer 19 (e.g., a Rochon prism), a wavelength that is dependent on the angular position of the drive 17. Light from the source is linearly polarized by the polarizer and the undeviated beam passes through waveplate 20 which establishes the state of polarization of the light incident on the oriented sample in holder 21. The latter will absorb a certain percentage of the radiation incident thereon, and the transmitted portion will pass through depolarizer 15 so as to make the transmitted light compatible with the detector which provides an output signal proportional to the quantity of light transmitted by the sample. If the calibration is to measure optical density, the pen of the recorder (not shown) will be deflected on the paper chart 25 (illustrated in FIG. 2) an amount proportional to the optical density of the sample corresponding to the wavelength associated with the angular position of drive 17. The second or reference channel of the spectrophotometer will contain a reference specimen.

As the drive operates, the wavelength of the output of the variable monochromator 13 is changed continuously in synchronism with the movement of the paper chart. Simultaneously, the plane of polarization of light incident on the oriented sample in holder 21 rotates due to the interposition of the waveplate 20 between the polarizer 19 and the sample holder, the precise state of polarization being dependent on the relative retardation $\phi_\lambda$ introduced by the waveplate. The relative retardation is a periodic function of $(\Delta n_\lambda)/\lambda$ where $\Delta n_\lambda$ is the birefringence of the material of the plate and $\lambda$ is the wavelength of the light incident thereon. As the wavelength continuously changes, the relative retardation changes thus changing the state of polarization periodically between the horizontal and vertical, with all states of ellipticity inbetween. The period of the alternations of the state of polarization depends directly on the thickness of the waveplate and the ratio $\Delta n_\lambda /\lambda$. As a consequence, the period changes with wavelength as indicated by the solid line in FIG. 2, increasing with increases in wavelength.

Figure 2:
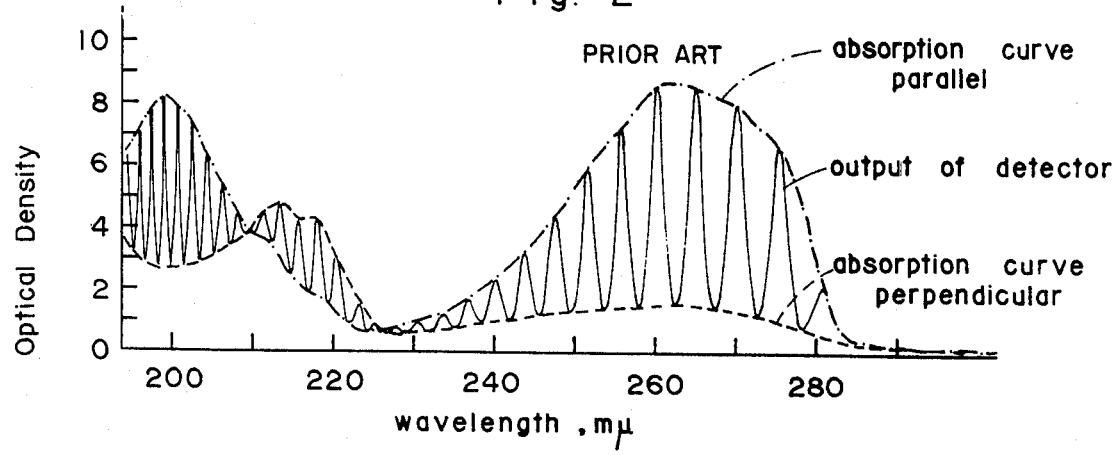
FIG. 2 is a reproduction of a spectral record of an oriented sample comprising stretched polyethylene film containing oriented molecules of p-methoxydenzoic acid.

FIG. 2 shows a reproduction of a paper chart obtained when the sample specimen is stretched polyethylene film containing oriented molecules of p-methoxybenzoic acid (the second or reference channel of the spectrophotometer in this instance containing a reference specimen in the form of identically stretched plain polyethylene film).

The envelope of the oscillations produced by the pen of the recorder 18 corresponds to the absorption curves for light polarized in directions parallel and perpendicular to the direction of orientation of the molecules. Except in the region 210–225 m$\mu$, the crests of the oscillations define discrete points on the absorption curve for light polarized in a direction parallel to the direction of orientation while the troughs of the oscillations define discrete points on the absorption curve for light polarized in a direction perpendicular to the direction of orientation. The two absorption curves can thus be obtained by visually fitting a curve to the peaks and valleys as shown in FIG. 2, or by recording the crests and troughs data points and analytically determining the equations of the best fitting curves.

With knowledge of the absorption curves, the dichroic ratio at any wavelength may be determined. For example, the dichroic ratio at a wavelength of 250 m$\mu$ is obtained by taking the ratio of the ordinate of the absorption curve for light polarized in a direction parallel to the direction of orientation to the ordinate of the absorption curve for light polarized in a direction perpendicular to the direction of orientation. In this instance, at 250 m$\mu$, the dichroic ratio is 6.4/1.5 or about 4.3. It should be noted that the ordinates fall outside the data points obtained with the recorder 18 with the result that an approximation must be made introducing an error in the calculation of the dichroic ratio that depends on many factors.

In addition to the inaccuracies arising by reason of the necessity for interpolating between data points, the curve shown in FIG. 2 illustrates another limitation on accuracy, namely, the imprecision in the location of the wavelengths at which the dichroic ratio is unity. Attempts to more accurately define the absorption curves by reducing the spacing between adjacent crests and troughs by changing the thickness of the waveplate, for example, are frustrated by the finite resolving power of the spectrophotometer which operates to reduce sharp peaks in the output of the detector and raise deep valleys thus concealing the true location of the absorption curve. Furthermore, a region of large slope of the absorption curve is poorly defined by the envelope of oscillations.

Figure 3:
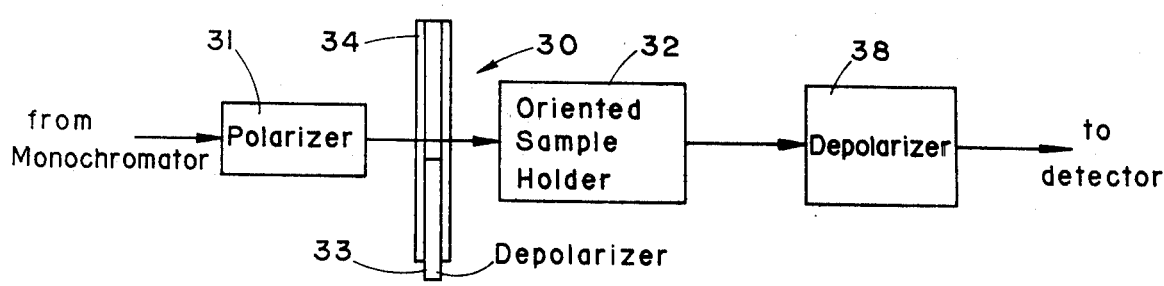
FIG. 3 is a block diagram of an optical system according to the present invention for obtaining the dichroic ratio of an oriented sample.
Figure 4:
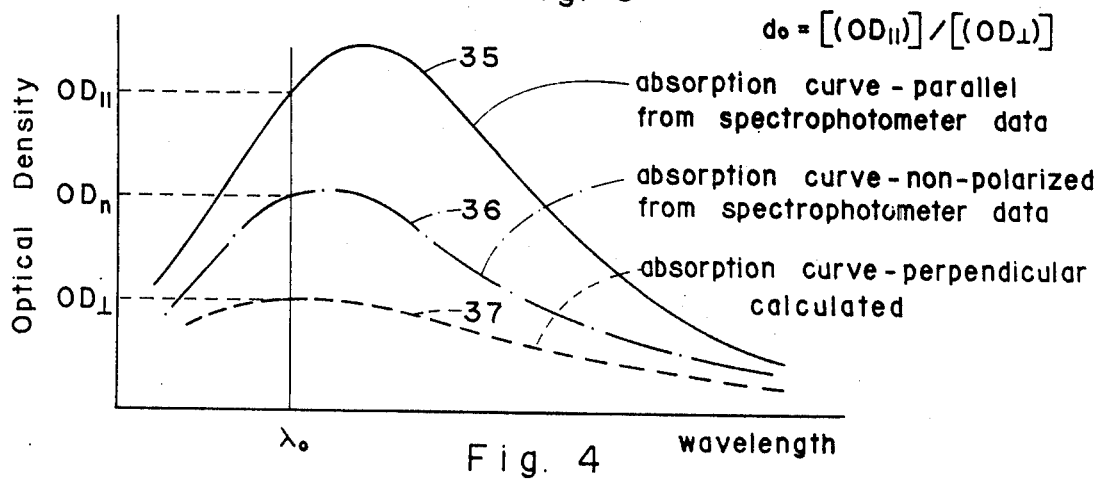
FIG. 4 is an idealized spectral record obtained with the optical system shown in FIG. 3 incorporated into a standard spectrophotometer.

All of the above deficiencies are eliminated when the optical system 30 shown in FIG. 3 is substituted for accessory 11 shown in FIG. 1. System 30 comprises a standard polarizer 31 similar to polarizer 19, an oriented sample holder 32 similar to holder 21, a depolarizer 33 mounted within a suitable guide 34 such that the depolarizer may be selectively interposed between the sample holder 32 and the polarizer 31, and an auxiliary depolarizer 38. When the depolarizer is in the position shown in FIG. 3, i.e., out of the optical path of the light emerging from polarizer 31, the sample orientation may be adjusted so that the direction of orientation is either parallel or perpendicular to the plane of polarization of light incident thereon. The orientation selected depends on which orientation yields the largest output falling within the limits of the recorder. For example, if, in the band of wavelengths of interest, the peak or peaks of the absorption curve for light polarized in a direction parallel to the direction of orientation exceeds the peak or peaks of the absorption curve for light polarized in a direction perpendicular to the direction of orientation, but nevertheless falls within full-scale deflection of the pen of the recorder (see FIG. 4), then the attitude of the sample would be adjusted until the direction of orientation is parallel to the direction of polarization. On the other hand, if the reverse situation is true, then the attitude of the sample would be adjusted until the direction of orientation is perpendicular to the direction of polarization. In this way, data are produced with maximum accuracy, a significant advantage over the prior art.

Having selected the attitude of the specimen in accordance with the above criterion, the spectrophotometer may then be operated in a conventional manner to vary the wavelength of light incident on the sample and to record the resultant optical density as a function of wavelength. If light polarized in a direction parallel to the direction of orientation is used, an absorption curve similar to curve 35 in FIG. 4 will be obtained, it being understood that the shape of curve 35 has been selected to conveniently illustrate the invention. Having obtained curve 35, depolarizer 33 is then inserted into the optical path between the polarizer and the oriented sample for the purpose of depolarizing the light incident on the oriented sample. The resultant non-polarized light will have associated with it an absorption curve which is obtained by actuating the drive of the spectrophotometer. The absorption curve for non-polarized light is also obtained as a continuous function of wavelengths as indicated by curve 36 in FIG. 4. With these two continuous curves, any point on a third curve 37 may be calculated using the relationship given in equation (1), such third curve being the absorption curve for light polarized in a direction perpendicular to the direction of orientation.

In a similar manner, curve 35 can be developed from curves 36 and 37 using equation (1). With knowledge of $OD_n$ and either $OD_\perp$ or $OD_\parallel$, the dichroic ratio at a given wavelength can be computed as follows:

$$d_o = \frac{OD_\parallel}{OD_\perp} = \frac{OD_\parallel}{OD_n - \lg[2 - 10^{(OD_n - OD_\parallel)}]} \quad (2)$$

if $OD_\parallel$ is measured, or $$d_o = \frac{OD_\parallel}{OD_\perp} = \frac{OD_n - \lg[2 - 10^{(OD_n - OD_\perp)}]}{OD_\perp} \quad (3)$$

if $OD_\perp$ is measured

In carrying out the measurements referred to above, system 30 is inserted into one channel of the spectrophotometer, while in the other channel thereof, there is inserted an identical system 30 but containing only the host material in the sample holder. For example, if the host is a film of polyethylene of predetermined thickness, the active medium would be suitably incorporated into a sheet of the film which would then be stretched to a predetermined degree to establish the direction of orientation. This would provide the oriented sample that would be used with system 30 in one channel of the spectrophotometer. In the other channel of the spectrophotometer, a stretched sheet of plain film would be used in the sample holder of the system therein.

When the active medium is contained in a host which is itself anistropic, the absorption by the host of light with different states of polarization will affect the output of the detector in a non-uniform manner. Compensation for the anisotropic nature of the host is achieved by establishing a correction factor in the following manner. A stretched sheet of plain film (i.e., the reference) is inserted into the sample holder of system 30 in one channel of the spectrophotometer. The other channel contains another system 30 with an empty sample holder 32. Two absorption curves, each a continuous function of wavelength, are then obtained by twice operating the drive of the spectrophotometer, one being the correction factor $OD^r_\parallel$ (or $OD^r_\perp$) for light polarized in a direction parallel (or perpendicular) to the direction of orientation of the reference film and the other being the correction factor $OD^r$ for non-polarized light. From these measurements, $OD^r_\perp$ (or $OD^r_\parallel$) is calculated using equation (1). The overall correction factor is:

$$\Delta OD^r = OD^r_\parallel - OD^r_\perp$$

(4)

When the host material is itself dichroic, equations (2) and (3) must be modified as follows:

$$d_o = \frac{OD_\parallel}{OD_\perp} = \frac{OD_\parallel}{OD_n - \lg[1 + 10^{-\Delta OD^r} - 10^{(OD_n - OD_\parallel - \Delta OD^r)}]} \quad 2(A)$$

$$d_o = \frac{OD_\parallel}{OD_\perp} = \frac{OD_n - \lg[1 + 10^{\Delta OD^r} - 10^{(OD_n - OD_\perp + \Delta OD^r)}]}{OD_\perp} \quad 2(B)$$

Alternative to the arrangement shown in FIG. 3, system 30 can be organized so that polarizer 31 is adjacent sample holder 32 and thus interposed between depolarizer 33 and the sample holder. In this arrangement, it is the polarizer that must be moved into and out of the path of the light beam incident on the sample holder. When the polarizer is in the path, the incident light will be linearly polarized; and when the polarizer is out of the path, the incident light will be non-polarized.

Since the absorption curves obtained with the spectrophotometer are continuous functions of wavelength, there is no necessity for interpolation as was the case with the prior art. Furthermore, the finite resolving power of the spectrophotometer does not introduce any serious limitations on the accuracy with which the absorption curves may be obtained regardless of the dichroism of the sample, and regardless of the slope of the absorption curve. Furthermore, the precise points at which the dichroic ratio is unity can be ascertained easily. A still further advantage of the present invention resides in the fact that the operator has the choice of which of the two polarized absorption curves is to be utilized. For example, in some highly dichroic substances, the absorption curve for light polarized in one direction relative to the direction of orientation may be so large as to cause the pen of the recorder to go off scale while the other curve can easily be accommodated. In such case, an operator would select the second absorption curve as the one to be recorded along with the non-polarized curve.

Finally, the present invention eliminates an expensive and sensitive element previously used, namely, the waveplate and achieves a higher degree of accuracy.

We claim:

1. A method for obtaining data from which can be computed a pair of orthogonal linear dichroic parameters of an oriented sample comprising the steps of sequentially projecting through the sample two beams of light at the same wavelength, one of which is linearly polarized in a predetermined direction relative to the direction of orientation of the sample, and the other of which is nonpolarized, and obtaining the absorption of the sample in each beam.

2. A method according to claim 1, including the steps of varying the wavelength of both the polarized and non-polarized beam continuously over a predetermined band and obtaining the absorption of the sample as a continuous function of wavelength in the band.

3. A method according to claim 1 wherein the absorption of the sample is obtained by measuring its optical density.

4. A method according to claim 3 including serially arranging a depolarizer and a polarizer before the sample and selectively interposing the depolarizer between the sample and the polarizer to obtain the non-polarized beam, and selectively removing the depolarizer from between the sample and the polarizer to obtain the polarized beam.

5. A method according to claim 3 including serially arranging a depolarizer and a polarizer before the sample and selectively interposing the polarizer between the sample and the depolarizer to obtain the polarized beam, and selectively removing the polarizer to obtain the non-polarized beam.

6. A method according to claim 3 wherein said predetermined direction is parallel to the direction of orientation of the sample.

7. A method according to claim 3 wherein said predetermined direction is perpendicular to the direction of orientation of the sample.

8. A method according to claim 1 wherein the absorption of the sample is obtained by measuring its transmittance.

9. A method according to claim 8 wherein said predetermined direction is parallel to the direction of orientation of the sample.

10. An optical system for obtaining data from which can be computed a pair of orthogonal linear dichroic parameters of an oriented sample contained in a sample holder comprising a linear polarizer positioned in front of the sample holder, and a pair of de-polarizers, one of which is positioned behind the sample holder, and the other of which is selectively movable into and out of a position at which it is interposed between the polarizer and the sample holder.

11. An optical system according to claim 10 including a light source, and a variable wavelength monochromator for converting light from the source to a beam whose wavelength changes periodically with time, means mounting the source and the monochromator so that said beam passes through the linear polarizer, and a detector for detecting the intensity of light passed by said one de-polarizer.

12. A spectrophotometer rigged for dichroism studies comprising a light source, a variable wavelength monochromator for converting light from the source to a beam whose wavelength changes periodically with the time, a first de-polarizer for de-polarizing the beam before it passes through a sample holder, a second de-polarizer for de-polarizing light emitted from the sample holder, a detector for detecting the density of the light passed by the second de-polarizer and a linear polarizer selectively interposable between the first de-polarizer and the sample holder.

* * * * *

UNITED STATES PATENT AND TRADEMARK OFFICE
CERTIFICATE OF CORRECTION

PATENT NO. : 3,926,524
DATED : December 16, 1975
INVENTOR(S) : Leon Margulies et al It is certified that error appears in the above-identified patent and that said Letters Patent are hereby corrected as shown below:

Column 7, line 50, change equation (2) to read as follows:

$$d_o = \frac{OD_{\parallel}}{OD_{\perp}} = \frac{OD_{\parallel}}{OD_n - \lg[2 - 10^{(OD_n - OD_{\parallel})}]}$$

Column 7, line 55, change equation (3) to read as follows:

$$d_o = \frac{OD_{\parallel}}{OD_{\perp}} = \frac{OD_n - \lg[2 - 10^{(OD_n - OD_{\perp})}]}{OD_{\perp}}$$

Column 10, line 31, delete "the" (first occurrence);

Column 10, line 34, change "density" to --intensity--.

Column 10, after line 37, add the following claim:

13. A method according to claim 8 wherein said predetermined direction is perpendicular to the direction of orientation of the sample.

Signed and Sealed this

Seventh Day of September 1976

[SEAL]

Attest:

RUTH C. MASON
*Attesting Officer*

C. MARSHALL DANN
*Commissioner of Patents and Trademarks*